United States Patent [19]

Ollivier

[11] Patent Number: 4,594,704

[45] Date of Patent: Jun. 10, 1986

[54] SPARE SUBSCRIBER TERMINAL DEVICE IN A DIGITAL CONCENTRATOR

[75] Inventor: Yves Ollivier, Kerguinien, France

[73] Assignee: Compagnie Industrielle des Telecommunications Cit-Alcatel, Paris, France

[21] Appl. No.: 672,325

[22] Filed: Nov. 16, 1984

[30] Foreign Application Priority Data

Nov. 23, 1983 [FR] France .................. 83 18645

[51] Int. Cl.$^4$ .............................................. H04J 1/16
[52] U.S. Cl. ...................................... 370/16; 370/56; 179/175.3 S
[58] Field of Search .................. 179/175.3 S, 175.2 R, 179/175.2 C, 175.3 R, 18 EA; 370/56, 16, 13

[56] References Cited

U.S. PATENT DOCUMENTS 4,451,708 5/1984 Kemler et al. .................. 370/16

FOREIGN PATENT DOCUMENTS 55-115786 9/1980 Japan.

OTHER PUBLICATIONS

Supplement to Electrical Communication, vol. 55, No. 2, 1980 (London) Network Terminal and Control Elements, pp. 24-30.

Primary Examiner—Douglas W. Olms
Assistant Examiner—Kenneth I. Rokoff
Attorney, Agent, or Firm—Sughrue, Mion, Zinn, Macpeak & Seas

[57] ABSTRACT

A concentrator is connected to a line test bus (BL) and a terminal test bus (BT) which are common to a plurality of concentrators. A concentrator is constituted by a plurality of terminal units (UT1 to UTm) connected to a spare bus (BS) internal to the concentrator. Each terminal unit includes a plurality of terminals (T1 to Tn) with associated terminal relays (R1 to Rn), a control logic circuit (LOG) and an isolating relay (RI) connected firstly to the spare bus, to the line test bus and to the terminal test bus, and secondly to the terminal relays by line wires (LA1, LA2) and junctor wires (LJ1, LJ2). In one of the terminal units of the concentrator, one of the terminals is a spare terminal (TS) and its associated terminal relay is a spare relay (RS) and the spare relay is directly connected to the spare bus.

2 Claims, 3 Drawing Figures

SPARE SUBSCRIBER TERMINAL DEVICE IN A DIGITAL CONCENTRATOR

The invention relates to a spare subscriber terminal device in a digital concentrator in which subscriber terminals are connected to subscriber lines via relay contacts for connecting the subscriber lines to test equipment or to subscriber terminals. The tests are performed by a device for testing the lines and the terminals, which device is connected via a line test bus and via a terminal test bus to contacts of the said relays. Conventionally, at least one spare terminal is provided for a given number of terminals, and the line test bus is used to connect the subscriber line of a faulty terminal to the spare terminal via the test connection relay associated with the faulty terminal. Thus the line test bus is no longer available for testing lines. Since the terminal test bus is connected to the faulty terminal by the test connection relay associated therewith and since the said relay is activated as a result of the fault in the faulty terminal, it is also impossible to test terminals, at least while the subscriber associated with the faulty terminal is making a call, since the associated test connection relay cannot be switched to the rest position without interrupting the call.

When there is a large number of terminals it is no longer tolerable for line tests and terminal tests to be excluded when one of the terminals is faulty. The terminals are then subdivided into groups, and a test device is associated with each group which also includes a spare terminal. Tests are thus prevented only in the group which includes the faulty terminal. The drawback of this solution lies in the fact that it is necessary to provide a test device for each group and given the relatively small number of terminals in a group and the relatively small frequency at which tests are performed, this leads to a very low use rate for the test devices.

This drawback can be overcome by using an isolation relay in association with each group of terminals. The test device is then common to all of the groups and the line test bus and the terminal test bus are connected to all of the isolating relays. A device of this type is described in the U.S. Pat. No. 4,451,708 for "Spare subscriber terminal Apparatus". In this specification, a group is constituted by a plurality of terminal units together with a spare terminal unit, each terminal unit being constituted by a plurality of terminals. When one of the terminals in one of the terminal units breaks down, the entire terminal unit is swapped for the spare terminal unit by activating the test connection relays of the terminal unit having the breakdown. The test unit is common to the groups and it is possible to perform tests on a group by group basis except for the group in which there is a faulty terminal. Since the device described in this patent specification has all the subscriber lines of a terminal unit connected to the spare terminal unit, no tests can be performed on this group so long as any of the subscribers connected to the spare terminal unit is making a call.

Preferred embodiments of the present invention enable tests to be performed on a group which includes a faulty terminal.

SUMMARY OF THE INVENTION

The present invention provides a spare subscriber terminal device in a digital concentrator connected to a line test bus and to a terminal test bus, a concentrator comprising: terminal units each of which is constituted by a plurality of terminals, each of which is associated with a terminal relay, one of the terminals and the terminal relay associated therewith in one of the terminal units serving as a spare terminal and as a spare relay respectively, each terminal relay having a first set of contacts for connecting two wires of a subscriber line to the terminal in the rest position of the relay and to the line test bus in the working position of the relay, and a second set of contacts for connecting the terminal to the two wires of the subscriber line in the rest position of the relay and to the terminal test bus in the working position of the relay, each terminal unit including a logic control circuit controlling the terminal relays, the improvement wherein the terminal units of the concentrator are interconnected by a spare bus which is internal to the concentrator, wherein the first set of contacts of the spare relay is directly connected to the spare bus which acts as a subscriber line for the said spare relay, wherein each terminal unit further includes an isolating relay having a first set of contacts connected via two line wire to all the terminal relays for connecting the said line wires to the spare bus in the rest position of the isolating relay and to the line test bus in the working position of the isolating relay, and a second set of contacts connected via two junctor wires to all of the terminal relays for connecting the said junctor wires to the terminal test bus in the working position of the isolating relay and for isolating the said junctor wires from the terminal test bus in the rest position of the isolating relay, wherein the said line wires and the said junctor wires are normally isolated from the subscriber lines and the terminals at the said terminal relays so long as the terminal relays are in the rest position and are connected by the first and second sets of contacts of the terminal relays to the subscriber line wires and to the terminals respectively when the terminal relays are in the working position, wherein the isolating relays are normally at rest and one of the terminal relays is in the working position when the terminal associated therewith is faulty, and wherein to test subscriber lines and terminals in a terminal unit, the isolating relay of the said terminal unit is put into the working position, and the terminal relays thereof are successively put into the working position.

BRIEF DESCRIPTION OF THE DRAWINGS

An embodiment of the invention is described by way of example with reference to the accompanying drawings, in which.

MORE DETAILED DESCRIPTION

Figure 1:
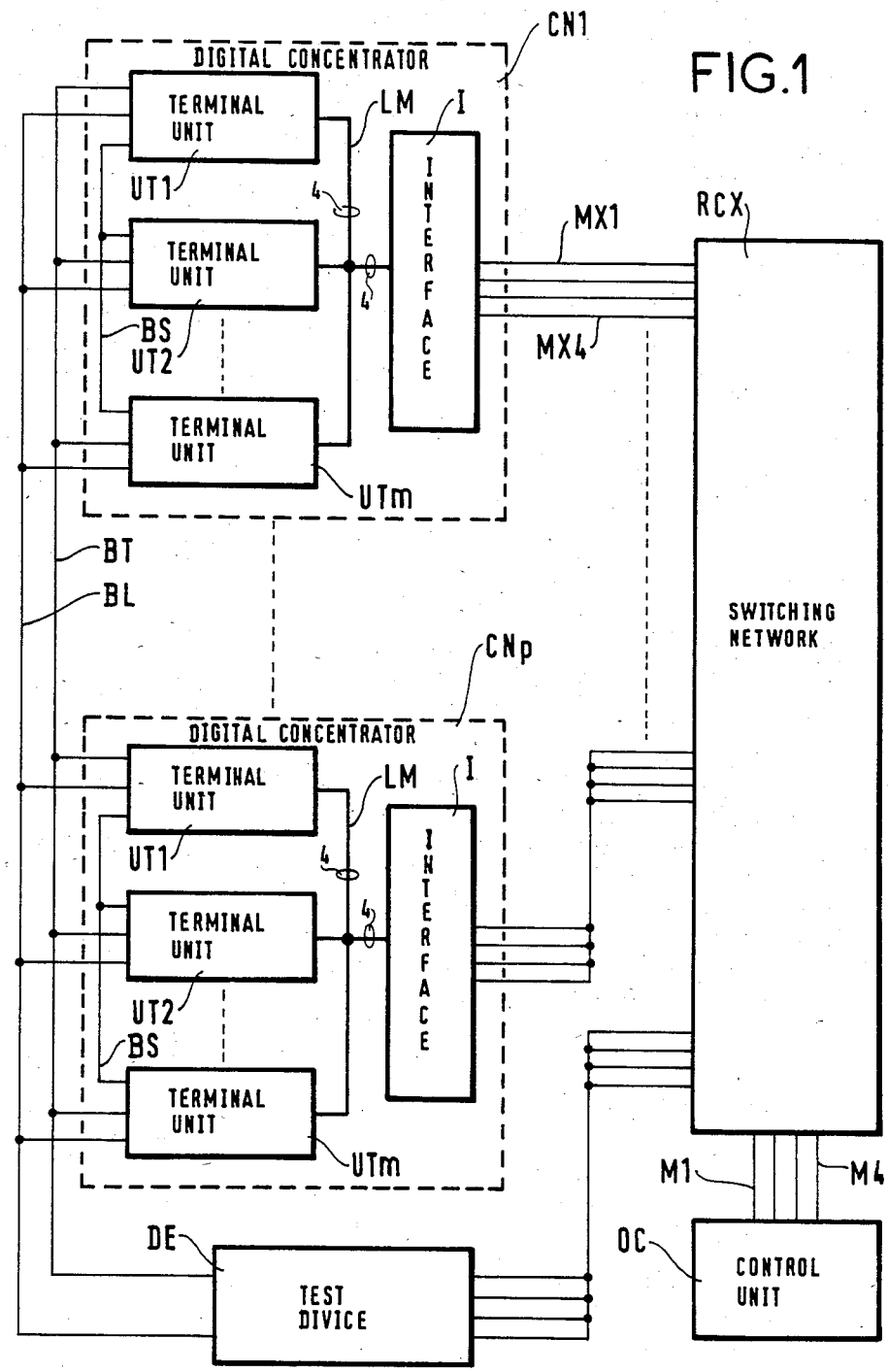
FIG. 1 is a block diagram of a digital satellite exchange to which the invention may be applied.

FIG. 1 is an overall diagram of a satellite digital exchange in which the invention is applied. Such a satellite digital exchange is constituted by p digital concentrators CN1 to CNp, each of which is connected via multiplex lines MX1 to MX4 to a switching network RCX which is itself connected via multiplex lines M1 to M4 to a control unit OC.

Figure 2:
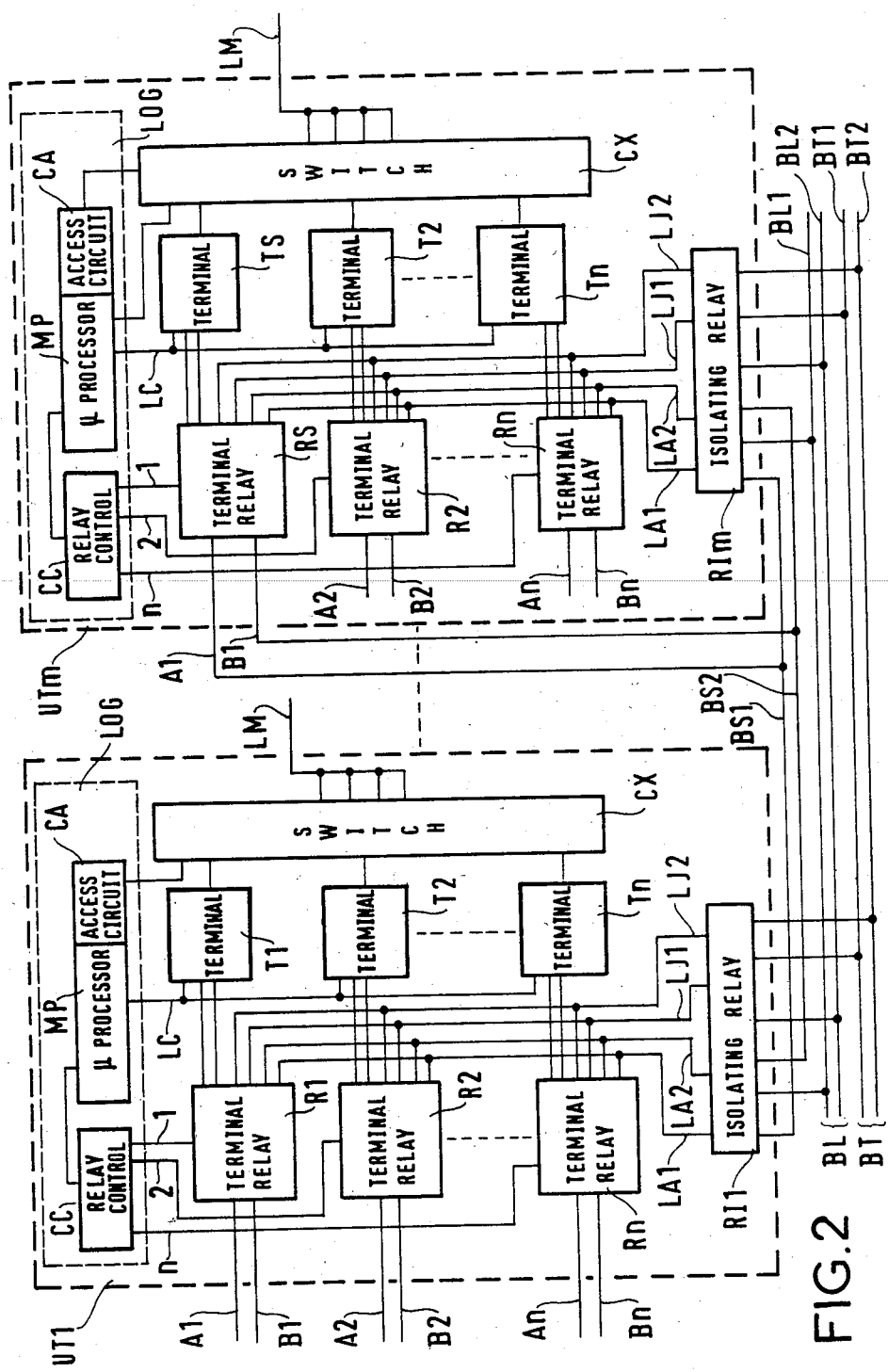
FIG. 2 is a block diagram of a digital concentrator shown in FIG. 1 and including the spare subscriber terminal device of the invention.

Each digital concentrator comprises m terminal units UT1 to UTm connected by a multiplex link LM (constituted by four multiplex lines) to an interface I which is itself connected to the multiplex lines MX1 to MX4. Each terminal unit comprises n terminals (not shown) with one terminal per subscriber. Each terminal is preferably a digital terminal which provides all the functions that are known collectively under the acronym Borscht. A test device DE is capable of performing tests of the subscriber lines and on the terminals by means of a line test bus BL and a terminal test bus BT. The test device DE is also connected to the switching network RCX by multiplex lines, with the tests being controlled by the control unit OC. In accordance with the invention, each terminal unit in the digital concentrators is connected to the line test bus BL and to the terminal test bus BT, and in each concentrator the terminal units are interconnected by a spare bus BS, with only one terminal unit of the concentrator including a spare terminal as shown in FIG. 2. Each terminal unit comprises, for example, 16 terminals and a concentrator comprises 16 terminal units, giving a total of 256 terminals. Since there is a spare terminal in the concentrator up to 255 terminals can be connected to respective subscriber lines.

FIG. 2 shows two of the terminal units of the digital concentrator of FIG. 1 which is constituted by f terminal units UT1 to UTm. Each terminal unit comprises n terminals T1 to Tn connected to subscriber lines A1 B1, A2 B2, ... An Bn respectively via respective terminal relays R1, R2, ... Rn. A switch CX is connected firstly to each terminal and secondly to the interface I of the concentrator via a multiplex link LM which is constituted by four multiplex lines. Each terminal unit further includes an isolating relay RI1 to RIm which is firstly connected to the spare bus BS, to the line test bus BL and to the terminal test bus BT, and which is secondly connected to all the terminal relays by a pair of line wires LA1 and LA2 and by a pair of junctor wires LJ1 and LJ2. A logic control circuit LOG essentially constituted by a microprocessor MP is connected to the terminals T1 to Tn by a control link LC and to the switch CX via an access circuit CA. The microprocessor MP may, for example, be a circuit of the 8031 family manufactured by Intel. The access circuit CA and the switch CX are integrated in a TP 3120 package by National Semiconductor. The access circuit CA serves to supervise the interchange of messages between the microprocessor MP and the control unit OC of the satellite exchange via a signalling channel of the multiplex links LM, MX1 to MX4 and M1 to M4 connecting a terminal unit to the control unit OC. The interchange of messages is supervised using using a procedure known under the initials HDLC.

The control logic circuit LOG also includes a control circuit CC having its input connected to the microprocessor MP and controlling n outputs 1, 2, ... n which are connected to the terminal relays R1 to Rn respectively.

The terminal relays R1 to Rn of the terminal units UT1 to UTm are normally at rest and in this position they directly connect the terminals T1 to Tn to the pairs of wires A1 B1, ... An Bn of the subscriber lines.

The isolating relays RI1 to RIm are likewise normally at rest. In this position the line wires LA1 and LA2 are connected to respective lines BS1 and BS2 of the spare bus BS, and the junctor wires LJ1 and LJ2 are isolated from the two lines BT1 and BT2 of the terminal test bus BT. The line wires LA1 and LA2 and the junctor wires LJ1 and LJ2 are only connected to the wires BL1 and BL2 of the line test bus BL and BT1 and BT2 of the terminal test bus BT respectively when the isolating relay RI1 to RIm is in the working position.

In the terminal unit UTm, which is identical to the other terminal units, the first terminal TS is a spare terminal, and the first terminal relay associated therewith RS is a spare relay. The spare relay is connected to the wires BS1 and BS2 of the spare bus B1 via the wires A1 and B1 which are thus not connected to a subscriber.

Figure 3:
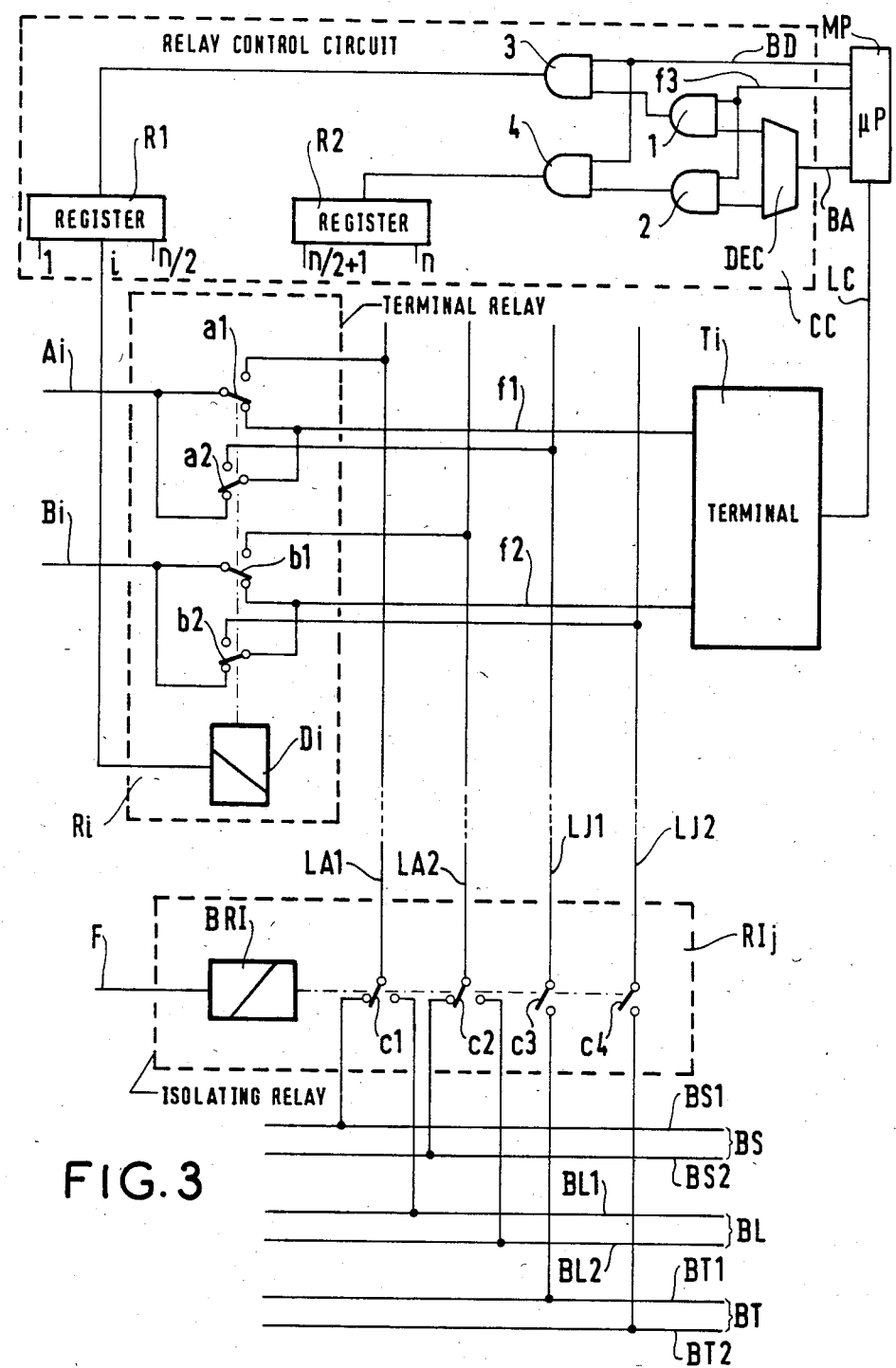
FIG. 3 is a diagram of a portion of a terminal unit in the digital concentrator shown in FIG. 2.

FIG. 3 shows a portion of a terminal unit UTj of the FIG. 2 concentrator and more particularly, it shows one of the terminal relays Ri, the isolating relay RIj, and the control circuit CC of the terminal unit UTj. The relays are shown in their normal, i.e. rest, position.

The terminal relay Ri has two sets of contacts a1, b1 and a2, b2, with the first set of contacts being connected to the wires Ai and Bi of a subscriber line and the second set of contacts being connected to two wires f1, f2 to the corresponding terminal Ti. In the rest position, the two sets of contacts connect the wires Ai and Bi to the terminal Ti via the wires f1 and f2. In the working position the first set of contacts a1, b1 connects the subscriber wires Ai, Bi to the line wires LA1 and LA2 respectively, while the second set of contacts a2, b2 connects the terminal wires f1 and f2, i.e. the terminal Ti, to the junctor wires LJ1 and LJ2 respectively. The terminal relay Ri is put into the working position by having current applied to its winding Di by the control circuit CC. The control circuit CC comprises a decoder DEC and four AND gates 1, 2, 3 and 4 together with two registers R1 and R2. The microprocessor MP is connected to the decoder DEC by an address bus BA, and to one input of the AND gates 1 and 2 by a write wire f3, and to one input of the AND gates 3 and 4 by a data bus BD. The output from the AND gate 1 is connected to another input of the AND gate 3, and the output from the AND gate 2 is connected to another input of the AND gate 4. The output from the AND gate 3 is connected to a parallel input of the register R1 and the output from the AND gate 4 is connected to a parallel input of the register R2. Each of the registers has n/2 outputs. The outputs 1 to n/2 from the register R1 are connected to the windings of the terminal relays R1 to Rn/2 respectively, while the outputs (n/2+1) to n from the register R2 are connected to the windings of the terminal relays R(n/2+1) to Rn. The microprocessor MP controls the terminal relays R1 to Rn via the registers via the registers R1 and R2. To actuate the relays, i.e. to put them into the working position, the microprocessor MP applies the corresponding address to register R1 or R2 via the address bus BA and presents data on the data bus BD, which data comprises a value 1 bit for the relay to be actuated in the corresponding register with the other bits being at value 0. Finally, the microprocessor delivers a write signal over the write wire f3 which enables the state of the data bus BD to be stored in the register R1 of R2 depending on the address delivered by the decoder DEC.

The isolating relay RIj has a first set of contacts c1, c2 and a second set of contacts c3, c4. The first set of contacts c1, c2 is connected to the line wires LA1 and LA2 respectively while the second set of contacts c3, c4 is connected to the junctor wires LJ1 and LJ2 respectively. In the rest position, the contacts c1 and c2 connect the line wires LA1 and LA2 to the wires BS1 and BS2 respectively of the spare bus, while the contacts c3 and c4 do not connect the junctor wires LJ1 and LJ2 to the wires BT1 and BT2 of the terminal test bus. In other words, they isolate the junctor wires LJ1 and LJ2. In the working position of the isolating relay, the contacts c1 and c2 connect the line wires LA1 and LA2 to the wires BL1 and BL2 respectively of the line test bus, while the contacts c3 and c4 connect the junctor wires LJ1 and LJ2 to the wires BT1 and BT2 respectively of the terminal test bus. The isolating relay RIj is put into the working position when current is applied to its winding BRI by the microprocessor MP of the terminal unit UTj with the current arriving a wire F.

When one of the terminals Ti of a terminal unit UTj in a concentrator breaks down, the microprocessor MP of the terminal unit uses the control circuit CC to swirch the terminal relay Ri to the working position. The subscriber line Ai, Bi is thus connected via the contacts a1 and b1 of the terminal relay Ri to the line wires LA1 and LA2, and thus via the contacts c1 and c2 of the isolating relay RIj to the wires BS1 and BS2 of the spare bus, and consequently via the relay RS of the terminal unit UTm to the spare terminal TS. It may be observed, that if the faulty terminal Ti is in the same terminal unit UTm as the spare terminal, the subscriber line Ai, Bi is connected to the spare terminal TS via the contacts a1, b1 of the terminal relay Ri and the contacts c1, c2 of the isolating relay RIm. A subscriber line is thus switched over to the spare terminal in the same manner regardless of whether and faulty terminal is in the same terminal unit as the spare terminal unit or not.

Tests on subscriber lines and on junctors are performed by switching the isolating relay to the working position in the appropriate terminal unit thereby connecting the line wires LA1 and LA2 to the wires BL1 and BL2 of the line test bus and the junctor wires LJ1 and LJ2 to the wires of the terminal test bus BT1 and BT2, and then individually switching on the terminal relays R1 to Rn. It is thus possible to proceed with tests in all the terminal units of all the concentrators CN1 to CNp of a satellite exchange except for the terminal unit in a concentrator having a terminal Ti which is faulty and the subscriber normally connected to the faulty terminal is actually making a call. As soon as the subscriber terminates the call, it is possible to test the terminal unit to which the subscriber belongs by switching the relay Ri to the rest position. It may be observed that in the terminal UTm which includes the spare terminal, it is still possible to test the lines and the other terminals T2 to Tn when the spare terminal is being used since the spare terminal relay RS associated with the spare terminal is directly connected to the wires BS1 and BS2 of the spare bus and is not connected thereto via the contact c1 and c2 of the isolating relay RIm. Naturally the terminal unit including the spare terminal cannot be tested if one of its other terminals is faulty and the subscriber associated therewith is making a call via the spare terminal.

In the circuit described in the above-mentioned U.S. Pat. No. 4,451,708, it is not possible to perform tests in a group which includes a faulty terminal (such a group constituting a concentrator), whereas the device of the present invention makes it possible to perform tests on all the terminal units of a concentrator except for the terminal unit including a faulty terminal. In the above-mentioned example of a concentrator constituted by 16 terminal units each having 16 terminals, there is only one terminal unit, i.e. 16 subscriber lines and 16 terminals which cannot be tested for as long as the subscriber normally connected to the faulty terminal is making a call. In U.S. Pat. No. 4,451,708 a group includes a spare terminal unit to which an entire terminal unit including a faulty terminal is switched so that performing tests in the group requires that none of the subscribers connected to the swapped over terminal unit should be making a call, whereas in the device in accordance with the invention, only one terminal is switched over and consequently tests on the affected terminal unit only have to wait for one subscriber to stop making a call.

The ratio between the number of spare terminals and the number of active terminals, i.e. terminals which are connected to subscriber lines, should be such that the probability of a simultaneous fault on two active terminals should be negligible. In the above example the ratio of one spare terminal per 255 active terminals is adequate.

In the example illustrated in FIG. 1, the test device DE is common to the concentrator CN1 to CNp, but it is obvious that there could be a test device provided for each concentrator without changing the invention.

I claim:

1. A spare subscriber terminal device in a digital concentrator connected to a line test bus and to a terminal test bus, a concentrator comprising: terminal units each of which is constituted by a plurality of terminals, each of which is associated with a terminal relay, one of the terminals and the terminal relay associated therewith in one of the terminal units serving as a spare terminal and as a spare relay respectively, each terminal relay having a first set of contacts for connecting two wires of a subscriber line to the terminal in the rest position of the relay and to the line test bus in the working position of the relay, and a second set of contacts for connecting the terminal to the two wires of the subscriber line in the rest position of the relay and to the terminal test bus in the working position of the relay, each terminal unit including a logic control circuit controlling the terminal relays, the improvement wherein the terminal units of the concentrator are interconnected by a spare bus which is internal to the concentrator, wherein the first set of contacts of the spare relay is directly connected to the spare bus which acts as a subscriber line for the said spare relay, wherein each terminal unit further includes an isolating relay having a first set of contacts connected via two line wires to all the terminal relays for connecting the said line wires to the spare bus in the rest position of the isolating relay and to the line test bus in the working position of the isolating relay, and a second set of contacts connected via two junctor wires to all of the terminal relays for connecting the said junctor wires to the terminal test bus in the working position of the isolating relay and for isolating the said junctor wires from the terminal test bus in the rest position of the isolating relay, wherein the said line wires and the said junctor wires are normally isolated from the subscriber lines and the terminals at the said terminal relays so long as the terminal relays are in the rest position and are connected by the first and second sets of contacts of the terminal relays to the subscriber line wires and to the terminals respectively when the terminal relays are in the working position, wherein the isolating relays are normally at rest and one of the terminal relays is in the working position when the terminal associated therewith is faulty, and wherein to test subscriber lines and terminals in a terminal unit, the isolating relay of the said terminal unit is put into the working position, and the terminal relays thereof are successively put into the working position.

2. A spare subscriber terminal device according to claim 1, wherein the isolating relay of a terminal unit which includes a faulty terminal is activated to the working position by the logic control circuit of the said terminal unit.

* * * * *